Jan. 10, 1967  KARL-HEINZ BECKURTS ETAL  3,297,539
NUCLEAR REACTOR, ESPECIALLY DESIGNED FOR
EXPERIMENTAL PURPOSES WITH
FAST NEUTRONS
Filed July 9, 1963
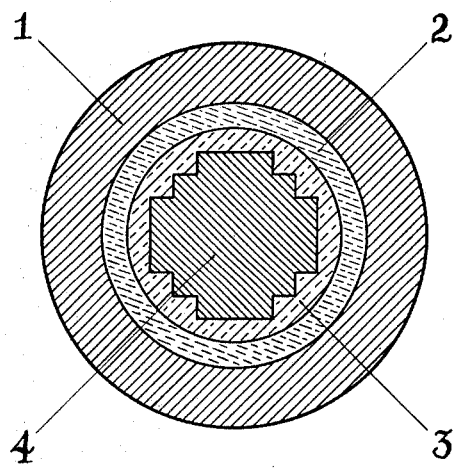
KARL-HEINZ BECKURTS, WOLF HAFELE & KARL OTT—INVENTORS
BY
Burgess, Dinklage & Sprung —ATTORNEYS 3,297,539
NUCLEAR REACTOR, ESPECIALLY DESIGNED FOR EXPERIMENTAL PURPOSES WITH FAST NEUTRONS
Karl-Heinz Beckurts, Danzigerstrasse 20, Karlsruhe, Germany; Wolf Häfele, Pfauenstrasse 24, Karlsruhe-Ruppurr, Germany; and Karl Ott, Litzenhardtstrasse 114, Karlsruhe, Germany
Filed July 9, 1963, Ser. No. 293,784
Claims priority, application Germany, July 13, 1962, K 47,225
7 Claims. (Cl. 176—41)

This invention relates to a nuclear reactor, especially designed for experimental purposes with fast neutrons and featuring an annular thermal core containing a moderator, such as water in addition to fissionable material, and an inner graphite reflector. Such nuclear reactors have become known under the name of "Argonaut" as so-called thermal annular reactors. They consist of an external graphite reflector layer and an inner layer also consisting of graphite, which also acts as a reflector. Between these two layers the annular core is arranged with a light water moderator and $U_3O_8$ and aluminum fuel elements.

Although nuclear reactors which generate fast, or high energy neutrons, commonly termed "fast reactors" are known in general, such reactors are not readily adaptable with safety to experimental use as in high energy reactor research. The experimental behaviour of the conventional fast reactors, especially their difficult shut-off properties, restrict their use for experimental purposes to a significant extent, i.e. too great an effort is necessary to maintain the required safety at any time.

In the reactor according to the invention the task of generating a fast neutron flux by nuclear fission processes has been solved in such a way that practically the spectre in the fast core is very similar to the spectre of a fast reactor, whereas during a power excursion the inherent shut-off properties of the known thermal reactors come into action, before the temperature in the fast core has reached an inadmissibly high value.

The invention provides a composite core structure for a nuclear reactor which when embodied therein will result in a reactor capable of generating fast neutrons safely, even under conditions of experimental operation. Essentially, the composite core of the instant invention comprises an inner fast core containing fissionable material, but subcritical of itself, a layer of material semi-permeable to the passage of neutrons therethrough and surrounding the exterior of the fast core, a graphite reflector surrounding the exterior of a semi-permeable layer, and an annular thermal core surrounding the exterior of the graphite reflector. In addition to fissionable material, the thermal core contains a moderator material, such as liquid water.

The fast and thermal cores although subcritical individually, cooperate with each other to form a critical composite reactor core which generates a fast neutron flux and in which the temperature of the fast core is limited for safety by the shut-off properties of the annular thermal core.

This result is brought about by constructing the fast and thermal cores of the reactor such that the ratio $V_S$ between the fission rate density $S_4$ in the fast core and the fission rate density $S_1$ in the thermal core is less than the ratio between the quantity of heat $W_4$ per cm.$^3$ required to raise the temperature of the fast core to its melting point and the quantity of heat $W_1$ per cm.$^3$ required to raise the temperature of the thermal core to its melting point. The fission rate densities $S_4$ and $S_1$ are the respective number of fissions per second per cm.$^3$ occurring in the fast and thermal cores. This condition can be expressed conveniently by the formula:

$$V_S = S_4/S_1 < W_4/W_1$$

From the well known thermodynamic relation between the specific heat constant, density and temperature change in a unit volume of material, these specific heat inputs $W_4$ and $W_1$ can be determined from the following formulas:

$$W_4 = C_4 \delta_4 \Delta T_4 \text{ and}$$
$$W_1 = C_1 \delta_1 \Delta T_1$$

wherein $C_1$ and $C_4$ are the specific heat constants of the thermal and fast core materials respectively, $\delta_1$ and $\delta_4$ are their respective densities, and $\Delta T_1$ and $\Delta T_4$ are respectively the difference between the actual operating temperatures and the melting point temperatures of the thermal and fast core materials. For the particular case of a metallic uranium fast core material, $W_4$ will be 724 cal./cm.$^3$, whereas for a uranium oxide and aluminum powder thermal core material, $W_1$ will be 370 cal./cm.$^3$, thus giving a ratio $W_4/W_1$ of 1.95 which is greater than the ratio $V_S = S_4/S_1$ of such a core combination.

Further details of the invention are more closely explained by the schematic drawing:

The figure shows a cross section of the reactor which consists of an annular thermal core 1 and is surrounded on the outside by a graphite reflector (not shown) which can be of conventional construction.

According to a preferred embodiment of the invention, the fast core 4 is arranged within the annular thermal core 1, and is surrounded on the exterior by a layer 3 of material semi-permeable to neutrons. This semi-permeable layer 3 can be constructed of any suitable material, such as for example natural uranium, and is in turn surrounded by a graphite reflector 2. The graphite reflector 2 is actually an inner reflector 2 since it is surrounded on its exterior by the annular thermal core 1.

The fast core 4 can be made of fissionable material in either lump or platelet form, but preferably platelets, and is expediently arranged within a single or a plurality of containers (not shown). In the case of fissionable platelets, thicknesses ranging between ⅛ to ⅟₁₆ of an inch can be used.

The thermal core is preferably filled with water (light) for moderating purposes, this water being preferably maintained at a temperature between 80° C. to 90° C. by any suitable conventional circulating and heat exchanging means (not shown).

The use of liquid water as a moderator in the thermal core 1 results in a considerable increase to the extent of several hundred percent in the negative temperature coefficient of the reactor.

In this case it is expedient to circulate the light water used as a coolant only about 20 times/h., it is circulated only as often as it is necessary for the homogeneity of the temperature distribution, which is an advantage, because the circulation does not cause noticeable cooling. The thicknesses of the inner graphite reflector 2 and the semi-permeable layer 3 are chosen in such a way that the fission densities in the cores 1 and 4 are such that during a power excursion the inherent shut-off properties of the original thermal nuclear reactor come into action, before the temperatures in the fast core have reached an inadmissibly high value.

The nuclear reactor according to the invention is especially suited for the experimental techniques with fast neutrons, such as for example in the calibration of fission chambers, experiments in neutron spectroscopy by nuclear emulsions, recoil counters etc., foil activation measurements and for the determination of spectral indices.

Ideally they are suited for closer experimental examination of the physics of coupled reactors.

The thickness of the semi-permeable layer 3 consisting of natural uranium should suitably be chosen sufficiently large that the peak of the fission distribution density around the outer layer of the core caused by thermal neutrons is depressed as far as possible. In the preferred embodiment of the invention this layer consisted of a blanket with a minimum thickness of 5 cm. The blanket was seamless, i.e. it had no radially continuous direct split. As fuel elements for the fast core uranium ($U^{235}$) was used in the form of 20% enriched uranium metal platelets, which were mixed with the same amount of natural uranium platelets.

The possibilities of realisation of the invention are not confined to the examples illustrated and described. Thus, as a rule, it will be of great advantage to shield the fast core against infiltration of liquid, especially of the moderator liquid of the thermal zone as far as possible. As in most cases the single containers of the fast core for the fissionable material are not seamlessly joined to each other, the liquid could at an extreme heating of the thermal core and consequent coolant expansion penetrate into the remaining splits, which considerably increases the danger of an excursion. This shielding can be achieved in the most simple case by designing at least the upper ends of the fuel elements somewhat thicker or by applying gaskets. These gaskets should be manufactured of comparatively soft material to secure good sealing. The interspaces can also be sufficiently sealed by a grid type frame. It is very important, especially for experimental reactors, that the good accessibility of the elements remain fully maintained and that also during manipulations, especially in changing the fuel elements, the shielding of the fast core against infiltration of liquid is maintained at any time.

The nuclear reactor according to the invention can be operated with all known moderators. Especially expedient is the use of liquid moderators like heavy water and light water. Instead of the graphite any other moderator materials can also be used.

We claim:

1. A composite core for a nuclear reactor, which comprises: (a) an inner fast core containing fissionable material, said fast core being subcritical by itself; (b) a layer of material semi-permeable to the passage of neutrons therethrough, said semi-permeable layer surrounding the exterior of said fast core; (c) a graphite reflector surrounding the exterior of said semi-permeable layer; and, (d) an annular thermal core surrounding the exterior of said graphite reflector, said thermal core containing fissionable material and a moderator material, said thermal core being subcritical by itself and cooperating with said subcritical fast core to form a critical composite reactor core which generates a fast neutron flux and wherein the temperature of the fast core is limited by the shut-off properties of the annular thermal core.

2. The composite reactor core of claim 1 wherein the fast core, annular thermal core, and the graphite reflector and semi-permeable layer are constructed to produce a fission rate density of $S_1$ fissions per second per cm.$^3$ in the thermal core, and a fission rate density of $S_4$ fissions per second per cm.$^3$ in the fast core which are in a ratio $S_4/S_1$ which is less than the ratio $W_4/W_1$, wherein $W_4$ and $W_1$ are respectively the quantities of heat per cm.$^3$ required to raise the temperature of said fast core and thermal core to their melting points.

3. The composite reactor core of claim 2 including a graphite reflector which surrounds the exterior of said annular core.

4. The composite reactor core of claim 3 wherein the moderator in the annular thermal core is water, and including temperature control means for maintaining said moderator water at a temperature within the range 80° C. to 90° C. to cool said thermal core.

5. The composite reactor core of claim 4 including a cover disposed over at least one of the end surfaces of the fast core to prevent the infiltration of moderator liquid into the fuel contained in said fast core.

6. A composite core for a nuclear reactor, which comprises an inner fast core containing fissionable material and being subcritical by itself, a seamless layer of uranium surrounding the exterior of said fast core, said layer being partially permeable to the passage of neutrons therethrough, a graphite reflector surrounding the exterior of said layer, and an annular thermal core surrounding the exterior of said graphite reflector, said thermal core containing fissionable material and a moderator material, said thermal core being subcritical by itself and cooperating with said subcritical fast core to form a critical composite reactor core which generates a fast neutron flux and wherein the temperature of the fast core is limited by the shut-off properties of the annular thermal core, further characterized in that said fast core, thermal core, graphite reflector and uranium layer are constructed to produce a fission rate density of $S_1$ fissions per second per cm.$^3$ in the thermal core, and a fission rate density of $S_4$ fissions per second per cm.$^3$ in the fast core which are in a ratio $S_4/S_1$ which is less than the ratio $W_4/W_1$, wherein $W_4$ and $W_1$ are respectively the quantities of heat per cm.$^3$ required to raise the temperatures of said fast and thermal cores to their melting points.

7. The composite reactor core of claim 6 wherein the uranium layer has a thickness of not less than 5 cm. for reducing the peak of the fission density distribution around the exterior of said fast core.

References Cited by the Examiner

UNITED STATES PATENTS

| 2,865,826 | 12/1958 | Stewart | 176—46 |
| 3,093,563 | 6/1963 | Menke | 176—42 |

OTHER REFERENCES

Proceedings of the Second U.N. International Conference on the Peaceful Uses of Atomic Energy, vol. 10 (1958), United Nations, Geneva, pp. 265–269.

REUBEN EPSTEIN, *Primary Examiner.*

CARL D. QUARFORTH, *Examiner.*